July 28, 1964  R. R. LUTHER  3,142,502
LONGITUDINALLY SPLIT HOSE CLAMP COUPLING
HAVING EXTRUSION REDUCING RIBS
Filed July 1, 1960
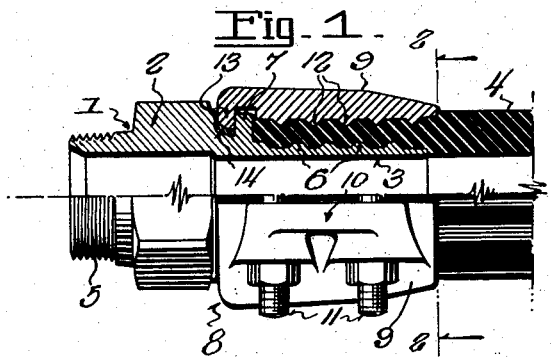
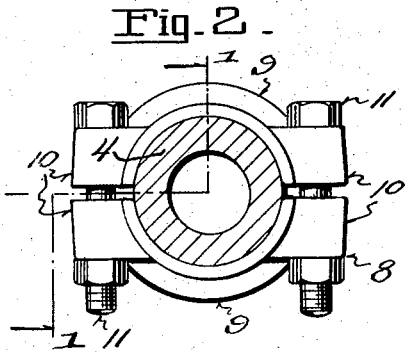
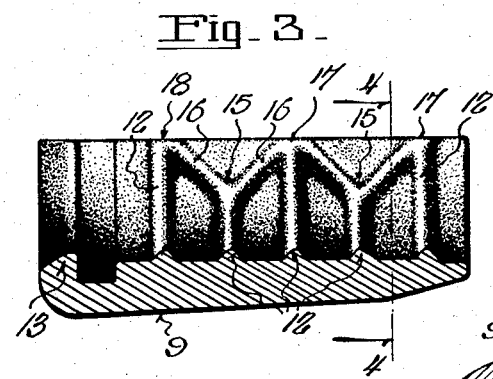
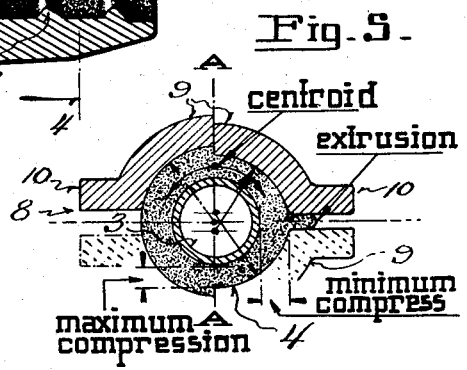
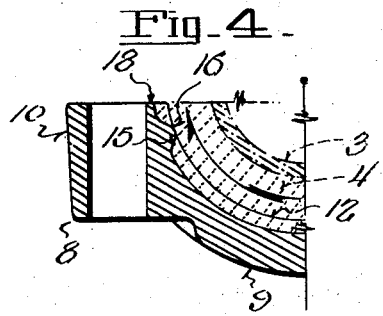
Inventor:
Roger R Luther

United States Patent Office 3,142,502
Patented July 28, 1964

---

3,142,502
LONGITUDINALLY SPLIT HOSE CLAMP COUPLING HAVING EXTRUSION REDUCING RIBS
Roger R. Luther, Zion, Ill., assignor to Anchor Coupling Co. Inc., Libertyville, Ill., a corporation of Illinois
Filed July 1, 1960, Ser. No. 40,411
2 Claims. (Cl. 285—242)

The present invention relates to hose couplings of the split clamp type, wherein a complementary pair of clamping sectors grip the hose wall under pressure in cooperation with a nipple or insert projected into the end of the hose, and serving as a connector for a fitting or piece of equipment.

More particularly, the invention comprises an improvement upon the clamp-type couplings disclosed in co-pending applications for U.S. Letters Patents, Serial Numbers 25,321, now abandoned, and 843,763, now abandoned, respectively.

In couplings of the present nature, when the clamp sectors are drawn together on the insert by means of contracting bolts, compression of the hose wall between the sectors and insert causes the rubber, or synthetic hose material, to flow transversely between spaced arcuate ribs formed on the gripping faces of the sectors, resulting in extrusion of the material through the spacing between the opposed longitudinal edges of the sectors. Since flow of the hose material is in opposite directions from the centroid of the arc of each sector, at which points maximum compression occurs, toward the zone of minimum pressure at the meeting areas of the sectors, considerable extrusion occurs between the longitudinal edges of the sectors, and the more extrusion the greater the pressure relief on the hose, and reduction of torsional strain on the contracting bolts, which naturally reduces the gripping action of the sectors on the hose, to the extent of causing failure through leakage or blow-off of the coupling.

Under the foregoing conditions, further contraction of the clamping sectors on the hose, in an endeavor to obtain the required gripping pressure, may result in mutilation or weakening of the hose wall, resulting in premature failure.

Therefore, it is the primary object of the present invention to provide the gripping faces of the clamping sectors of a coupling of the foregoing character, with means for retarding the flow of hose material and reducing extrusion between the spaced longitudinal edges of the sectors.

Incidental to the foregoing, a more specific object of the invention resides in the provision of auxiliary ribs formed on the internal faces of the clamp sectors between the annular ribs, to function as retaining dams for obstructing flow and consequent extrusion of the hose wall material.

A still further object is to form said dams in such a manner as to facilitate contraction of the sectors on the hose without excessive disturbance or mutilation of the hose surface.

The accompanying drawing illustrates one complete example of the physical embodiment of the present invention constructed according to the best mode so far devised for the practical application of the principles thereof. Other forms and modifications of the structural features shown are contemplated within the appended claims.

In the drawing:

FIG. 1 is a partial sectional and partial elevational view of a coupling incorporating features of the present invention, the same being taken on the line 1—1 of FIG. 2;

FIG. 2 is a transverse sectional view taken on the line 2—2 of FIG. 1;

FIG. 3 is an enlarged longitudinal sectional view of one of the clamp sectors illustrating in detail the preferred form of the invention;

FIG. 4 is a partial transverse sectional view of the sector shown in FIG. 3, taken on the line 4—4; and FIG. 5 is a schematic transverse composite sectional view to better illustrate the flowing action and extrusion of the hose material caused by contraction of the clamping sectors on the hose.

In the accompanying drawing the numeral 1 designates a coupling body, including an attaching head 2 provided with an extended insert 3 for projection into the end of a rubber or synthetic hose 4. The head 2 may be provided with a threaded end 5 for attachment to an adaptor fitting or piece of equipment. Obviously other forms of attachment may be employed without affecting the present invention.

The insert 3 is preferably provided with a series of spaced external annular ridges 6 to more firmly hold the hose on the insert. Spaced from the attaching head 2, the insert 3 is also provided with an annular external flange 7 spaced from the head 2, and, against which the end of the hose 4 is abutted.

Attached to the outer surface of the hose 4 is a split clamp 8, comprising a pair of complementary semi-cylindrical sectors 9 provided with oppositely disposed radial flanges 10, for receiving longitudinally spaced connecting bolts 11 that serve to draw the sectors 9 down upon the hose, and compress the hose wall between the sectors 9 and the insert 3.

The inner faces of the clamping sectors 9 are provided with spaced circular projections or ribs 12 that become embedded in the outer surface of the hose to more firmly grip the same, as best shown in FIG. 1. The sector ribs 12 and the insert ridges 6 are longitudinally staggered with relation to each other to create a crimping action on the hose for the most effective gripping of the hose wall without unduly reducing and weakening its thickness.

The outer ends of the sectors 9 are further provided with internal arcuate flanges or lips 13 that extend into the groove or space formed between the attaching head 2 of the coupling body and the flange 7 formed on the insert. The internal edges of the lips 13 are formed at an angle to engage a compressible ring 14 seated in the groove between the coupling head 2 and flange 7, to urge the lips 13 into engagement with the flange 7. This structure is fully described and claimed in said co-application Serial Number 843,763, and does not constitute an essential feature of the present invention, inasmuch as the invention is applicable to clamping sectors interlocked on the coupling body in various ways.

The predominant feature of the present invention is best illustrated in FIG. 3, and consists in the provision of a series of dams 15 in the form of staggered inclined ribs 16 disposed between the circular projections 12, each series of dams converging to an apex 17 adjacent the longitudinal facing edges 18 of the clamping sectors 9.

To better describe the purpose and function of the dams 15, particular reference will be had to the composite diagrammatic view shown in FIG. 5, in which two positions of a sector 9 are shown upon opposite sides of vertical diametric line A—A. On the left side of the line the sector is shown in its initial position seated on the hose 4, the inner diameter of the sector arc being substantially the same as the outer diameter of the hose. To avoid confusion and simplify explanation of the normal action of the hose wall under compression between the sectors, the circular ribs 12 and the dams 15 are not illustrated.

After the sectors 9 have been positioned on the hose and interlocked on the coupling body 1, the sectors are then drawn down on the hose by the bolts 11 to the final position illustrated on the right side of the diametrical line A—A. During this action of compression of the hose wall material, the same will flow in opposite directions from a centroid of the arc of the sector, as indicated by the double arrow passing through the centroid in FIG. 5.

Since the arcuate gripping faces of the sectors move from a concentric position on the outer diameter of the hose to an eccentric position in a vertical direction with relation to the diametrical line A—A, maximum compression of the hose wall occurs on the line A—A, and is gradually relieved toward the horizontal diameter of the hose, which causes an extrusion between the longitudinal facing edges of the sectors, as shown in FIG. 5.

Obviously, the more extrusion the more relief of compression of the hose wall, and should it be attempted to overcome this reduction of compression by further contracting the sectors, the hose wall might be detrimentally weakened or affected to the extent of causing premature failure.

Therefore, the salient purpose of the invention is to obstruct or retard the flow of the hose wall material and reduce extrusion of the same to a minimum. In the present instance this is accomplished by means of the dams 15, which retard flow of the wall material, and consequently reduce extrusion. In a nut-shell, that is the invention.

While the dams 15 may assume various forms to accomplish the purpose of the invention, in the preferred form, as shown in FIG. 3, the webs 16 of each series of dams 15 are formed obliquely or at an angle to the circular ribs 12, and terminate in apexes 17 adjacent the meeting edges 18 of the sectors. Consequently, as the sectors are contracted on the hose, the apexes 17 facilitate movement of the webs into the hose wall material, without unduly mutilating and disturbing the same.

From the foregoing explanation, considered in connection with the accompanying drawing it will be very apparent that an exceedingly simple and novel means has been devised for materially increasing the efficiency of clamp type couplings of the structure involved.

I claim:

1. A hose coupling of the split-clamp type comprising a coupling body including an attaching head having an extended insert for projection into the end of a rubber or synthetic hose, a pair of complementary semi-cylindrical sectors, means for securing the sectors together upon said coupling body in position to engage the outer surface of the hose to clamp the same on said insert, and bolts for contracting said sectors; inwardly extending circular ribs spaced apart longitudinally on the internal gripping surface of each sector, and radially inwardly projecting, longitudinally disposed auxiliary extrusion reducing ribs extending between said circular ribs adjacent the longitudinal edges of said sectors.

2. A hose coupling as set forth in claim 1, wherein said auxiliary ribs extend at an angle with respect to and converge with said circular ribs to form apexes at the longitudinal edges of said sectors.

References Cited in the file of this patent

UNITED STATES PATENTS

| | | |
|---|---|---|
| 858,575 | Claflin | July 2, 1907 |
| 894,216 | Kitzmiller | July 28, 1908 |
| 929,543 | Bronnell | July 27, 1909 |
| 957,492 | Brown | May 10, 1910 |
| 1,175,834 | Stephens | Mar. 14, 1916 |
| 1,532,596 | Madsen | Apr. 7, 1925 |
| 1,587,327 | Johnson | June 1, 1926 |
| 2,367,447 | Strout | Jan. 16, 1945 |
| 2,776,153 | Smith | Jan. 1, 1957 |
| 2,944,841 | Carpenter | July 12, 1960 |